Figure 1:
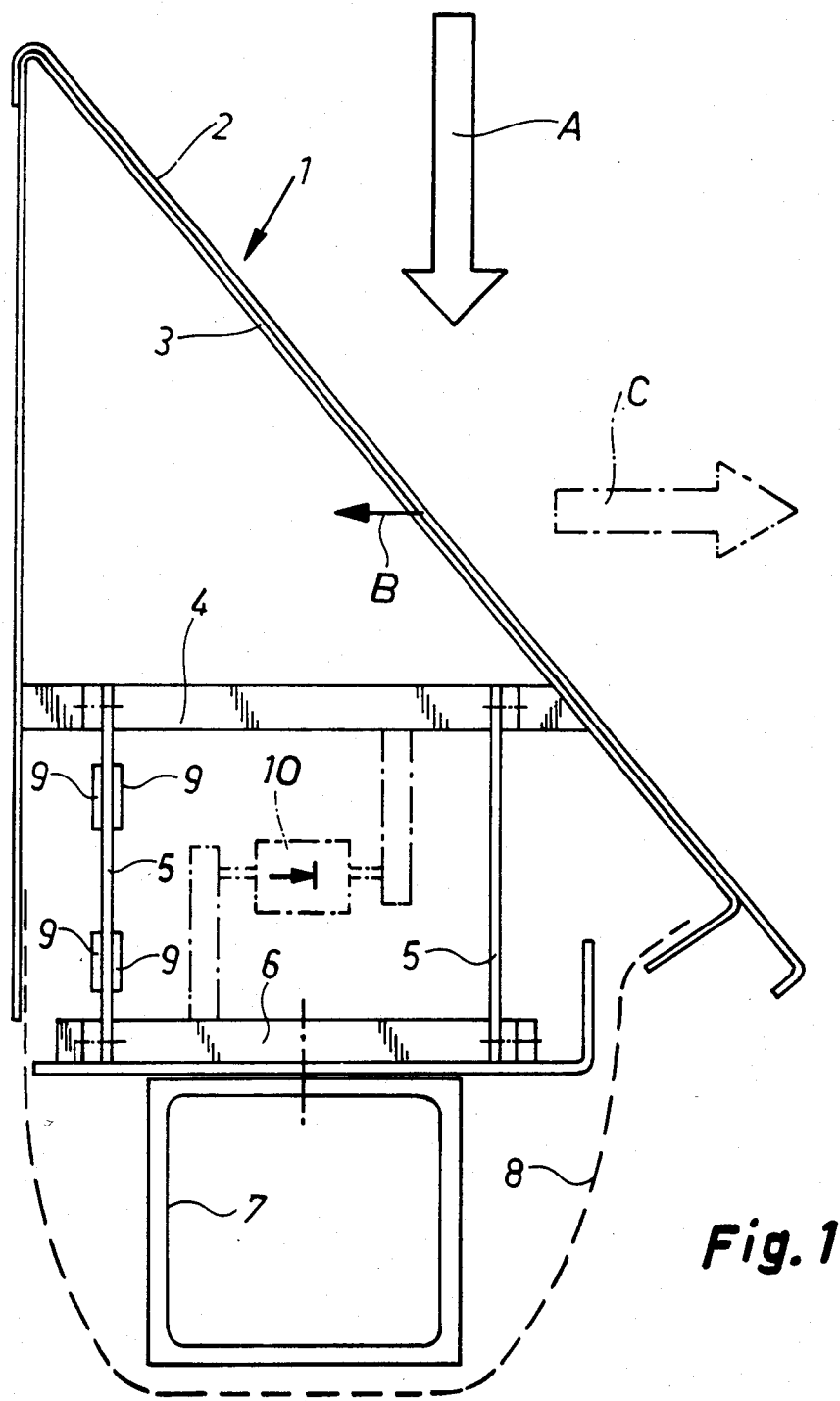

United States Patent [19]

Vesa

[11] Patent Number: 4,637,262

[45] Date of Patent: Jan. 20, 1987

[54] MASS FLOW RATE METER

[76] Inventor: Pekka Vesa, Kansakoulukatu 5, 15700 Lahti 70, Finland

[21] Appl. No.: 747,413

[22] Filed: Jun. 21, 1985

[30] Foreign Application Priority Data

Jul. 16, 1984 [FI] Finland .................................. 842852

[51] Int. Cl.$^4$ ............................................... G01F 1/30
[52] U.S. Cl. .................................................. 73/861.73
[58] Field of Search ........... 73/861.72, 861.73, 861.74, 73/434; 177/16, 15, 229

[56] References Cited

U.S. PATENT DOCUMENTS 4,063,456 12/1977 Jonkers .............................. 73/861.73

FOREIGN PATENT DOCUMENTS

| 2346967 | 4/1975 | Fed. Rep. of Germany ... 73/861.73 |
| 2947414 | 5/1981 | Fed. Rep. of Germany ... 73/861.73 |
| 3149715 | 6/1983 | Fed. Rep. of Germany ... 73/861.73 |

Primary Examiner—Charles A. Ruehl

[57] ABSTRACT

A mass flow rate meter, whose collision plate (1) is supported by means of spring plates (5) on a body (6, 7). The collision plate (1) is able to move in direction (B) perpendicular to the direction of the spring plates (5). The stiffness of spring plates (5) can be utilized to obtain a sufficiently high resonance frequency for collision plate (1) so that the periodic nature of mass supply would not lead to resonance oscillation of said collision plate.

11 Claims, 2 Drawing Figures

MASS FLOW RATE METER

The present invention relates to a mass flow rate meter, comprising a collision plate for a mass flow to be measured to hit against, means for supporting the collision plate so as to allow said collision plate to move against spring force along a substantially horizontal path that extends in a direction substantially transverse to the mass flowing direction, as well as means for sensing the distance travelled by said collision plate or the force applied to said collision plate in its travelling direction.

It is prior known to effect the measuring of chip flow associated with the manufacture of chip board by means of a mass flow rate meter of the above type of applying a collision plate principle. From a supplying bucket conveyor (inclined conveyor) the chips fall by way of baffle plates onto an inclined collision plate, the resulting elastic impact thereon exerting a horizontal component force on the collision plate. This force is directly proportional to mass flow. However, this force is not stable but varies essentially periodically according to variations in the mass flow. Variations in the mass flow result e.g. from the use of a bucket conveyor as a material supplying conveyor.

In the prior art mass flow rate meters, it has not been possible to design a counter-force producing spring so rigid that the resonance frequency of a collision plate would have increased substantially above the frequency of mass flow variations. Thus, a collision plate has tended to oscillate at its resonance frequency, thus leading to inaccurate measuring.

The object of the invention is to provide a mass flow rate meter, wherein a collision plate can be supported sufficiently rigidly relative to the main structure, so that the resonance frequency of a collision plate stays substantially above the frequency of mass flow variations.

This object is achieved on the basis of inventive features set out in the claims.

Figure 2:
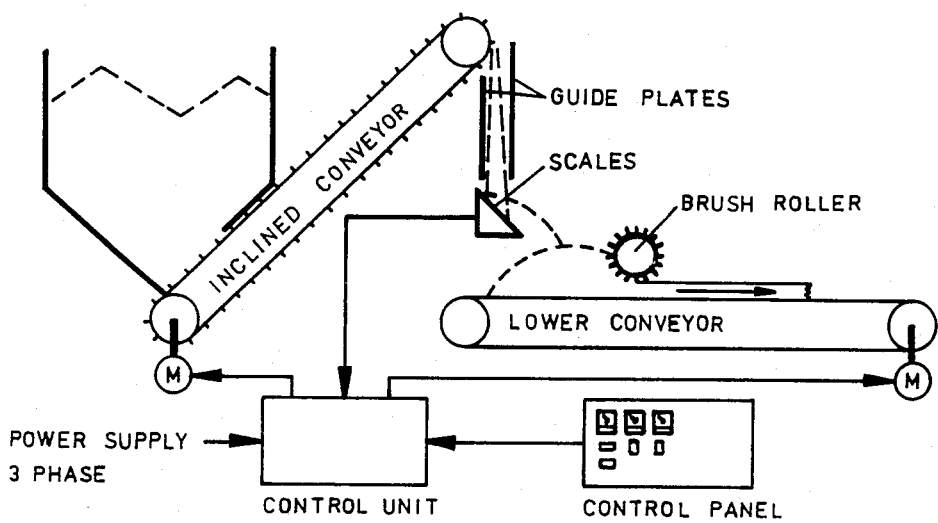

One embodiment of the invention will now be described with reference made to the accompanying drawings, in which FIG. 1 shows a mass flow rate meter of the invention in cross-section and FIG. 2 illustrates an application of the mass flow rate meter of the invention for measuring a chip flow in connection with the manufacture of chip boards.

A collision plate 1 comprises a plate member 3 bent into the shape of V turned upside down and an abrasion plate 2 mounted upon its inclined side.

When a falling mass flow collides in the direction of arrow A with the surface of plate 1, the result will be an elastic impact that causes the horizontal movement of collision plate 1 in the direction of arrow B. The mass bouncing from collision plate 1 proceeds in the direction of arrow C.

Said member or element 3 is fastened to a clamping element 4 to which the upper ends of upright spring plates 5 are rigidly secured. Spring plates 5 are spaced from each other in the same direction as the moving direction (B) of collision plate 1 and the lower ends of spring plates 5 are rigidly secured to an element 6 which in turn is fastened to the main beam 7. At least one of the spring plates 5 is fitted with a strain gauge sensor 9 in a manner known from the scales.

A force producing movement B of collision plate 1 can be continuously measured by means of the strain gauge sensor 9.

Spring plates 5 can be designed to be so stiff that the specific resonance frequency of a load carried thereby and at the same time that of collision plate 1 will be sufficiently high relative to the variation frequency of mass flow. For example, in a chip flow meter associated with chip board manufacturing, the frequency must be higher than 4 Hz, preferably 5-10 Hz, with the result that the mass flow variation of approximately 1 Hz frequency does not lead to resonating oscillation of the collision plate.

Reference numeral 8 designates a cover bag for protecting the mechanism against dust from below.

An essential feature of the invention is thus that a collision plate is fastened to the main structure by way of relatively rigid spring plates 5 which at the same time serve as mounting supports for the strain gauge sensor 9. An alternative structure can also be used, wherein the less stiff spring plates 5 are provided only for parallel support and the movement of the collision plate 1 relative to the body 6, 7 is bound and stiffened by a force measuring pick-up 10.

The length of a mass flow rate meter may vary quite substantially in the direction perpendicular to the plane of the drawing depending on the width of the falling mass flow. Thus, a plurality of sensor units 4, 5, 6 can be disposed in parallel relationship at suitable distances to provide collision plate 1 with sufficient support.

In most cases, however, two sensor units are sufficient mounted on the ends of collision plate 1.

I claim:

1. A mass flow rate meter, comprising a collision plate (1) for a mass flow to be measured to collide with, means (4, 5) for supporting collision plate (1) so as to allow said collision plate to move along a substantially horizontal path which is substantially transverse to the mass flow direction (A(before impact)), as well as means for sensing the distance travelled by collision plate (1) or the force applied to said collision plate in its travelling direction, characterized in that collision plate supporting means (4, 5) comprise spring plates (5), which are perpendicular to the direction of movement (B) of said collision plate and spaced from each other in the same direction as the direction of movement (B), the upper ends of said spring plates being rigidly fastened to a clamping element (4) of collision plate (1) and the lower ends thereof being rigidly secured to a body (6, 7), the ratio of the stiffness of spring plates (5) relative to the weight of the structure carried by the spring plates being selected in a manner that the specific resonance frequency of said collision plate is higher than 4 Hz.

2. A mass flow meter as set forth in claim 1, characterized in that at least one spring plate (5) is fitted with a strain gauge sensor.

3. A mass flow meter as set forth in claim 2, characterized in that the spring plates (5) are vertical and the collision plate (1) is in an inclined position above the spring plates.

4. A mass flow rate meter as set forth in claim 2, wherein said specific resonance frequency is in the range 5 to 10 Hz.

5. A mass flow meter as set forth in claim 1, characterized in that the spring plates (5) are vertical and the collision plate (1) is in an inclined position above the spring plates.

6. A mass flow rate meter as set forth in claim 5, wherein said specific resonance frequency is in the range 5 to 10 Hz.

7. A mass flow rate meter as set forth in claim 5, wherein said means for sensing the force applied to the collision plate comprises a force measuring pick-up (10) coupled between the collision plate and the body and having a stiffness which, along with the stiffness of said spring plates, is selected in a manner that the specific resonance frequency of said collision plate is higher than 4 Hz.

8. A mass flow meter as set forth in claim 7, wherein said specific resonance frequency is in the range 5 to 10 Hz.

9. A mass flow rate meter as set forth in claim 1, wherein said specific resonance frequency is in the range 5 to 10 Hz.

10. A mass flow rate meter as set forth in claim 1, wherein said means for sensing the force applied to the collision plate comprises a force measuring pick-up (10) coupled between the collision plate and the body and having a stiffness which, along with the stiffness of said spring plates, is selected in a manner that the specific resonance frequency of said collision plate is higher than 4 Hz.

11. A mass flow meter as set forth in claim 10, wherein said specific resonance frequency is in the range 5 to 10 Hz.

* * * * *